United States Patent
Ji et al.

(10) Patent No.: US 9,622,050 B2
(45) Date of Patent: Apr. 11, 2017

(54) NAVIGATION BY USING INSTANT MESSAGING

(71) Applicant: International Business Machines Corporation, Armonk, NY (US)

(72) Inventors: Xiao Feng Ji, Beijing (CN); Ya Ju Yan, Beijing (CN); Xin Che, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/737,597

(22) Filed: Jun. 12, 2015

(65) Prior Publication Data
US 2016/0366568 A1    Dec. 15, 2016

(51) Int. Cl.
*H04W 4/12* (2009.01)
*H04W 4/08* (2009.01)
*H04W 4/02* (2009.01)

(52) U.S. Cl.
CPC .............. *H04W 4/12* (2013.01); *H04W 4/025* (2013.01); *H04W 4/08* (2013.01)

(58) Field of Classification Search
CPC ...... H04L 67/02; G01C 21/20; G01C 21/3407
See application file for complete search history.

(56) References Cited

U.S. PATENT DOCUMENTS

| | | | |
|---|---|---|---|
| 7,741,968 B1 | 6/2010 | Tannenbaum et al. | |
| 8,284,748 B2 | 10/2012 | Borghei | |
| 2009/0276154 A1* | 11/2009 | Subramanian | G01C 21/20 701/469 |
| 2013/0332067 A1 | 12/2013 | Schlesinger et al. | |
| 2014/0129143 A1* | 5/2014 | Dave | G01C 21/3407 701/537 |
| 2014/0214933 A1* | 7/2014 | Liu | H04L 67/02 709/204 |

OTHER PUBLICATIONS

IBM; "WI—(Social Networking) Method for Collaborative Traveling"; IP.com Prior Art Database Technical Disclosure pp. 1-5; Original Publication Date: Mar. 6, 2010; Electronic Publication: Mar. 6, 2010.

* cited by examiner

Primary Examiner — Myron K Wyche
(74) Attorney, Agent, or Firm — Gilbert Harmon, Jr.

(57) ABSTRACT

A method for navigating is provided. The method comprises, in response to input on user equipment of a first member of a group who is travelling to a destination, one or more processors acquiring current position information of the user equipment of the first member. The method further includes one or more processors sending a first message to a server. The first message includes the current position information indicating an area where the first member was when the first message was sent. The first message is for directing a member of the group, who receives the first message when passing the area, to the same destination as the first member.

17 Claims, 3 Drawing Sheets

NAVIGATION BY USING INSTANT MESSAGING

BACKGROUND

The present invention is in relation to computer interaction, and more specifically, to navigation by using instant messaging.

In a group activity, members of the group normally need to travel to an activity spot. While traveling the members of the group can exchange messages with each other asking for help or assisting other members to arrive at the destination, i.e., the activity spot. Alternatively, members of the group may turn to a website or an application to search for information about the activity spot.

In the case of message exchanging, a group chat using an instant messaging (IM) tool will be applied. However, in a group chat (e.g., a thirty-people group), it would be quite difficult to search for useful information from a tremendous amount of messages to find your way to the activity spot.

On the other hand, if you turn to a website or an application such as a searching engine for help, the search result might have the following problems: the search result is not up to date; the search result is not related to any geographical point; and the search result is not what you exactly need. Additionally, to get a search result from a searching engine, you need a keyword. However, if you do not even know where you are nor the name of the destination, it is difficult to perform the searching operation with a searching engine.

SUMMARY

According to one embodiment of the present invention, it is provided a method for navigating. The method comprises, in response to input on user equipment of a first member of a group who is travelling to a destination, one or more processors acquiring current position information of the user equipment of the first member. The method further includes one or more processors sending a first message to a server. The first message includes the current position information indicating an area where the first member was when the first message was sent. The first message is for directing a member of the group, who receives the first message when passing the area, to the same destination as the first member.

According to another embodiment of the present invention, it is provided a system for navigating. The system comprises one or more processors, one or more computer readable storage media coupled to at least one of the one or more processors, and program instructions stored on the one or more computer readable storage media for execution by at least one of the one or more processors. The program instructions comprise, in response to input on user equipment of a first member of a group who is travelling to a destination, program instructions to acquire current position information of the user equipment of the first member. The program instructions further comprise program instructions to send a first message to a server. The first message includes the current position information indicating an area where the first member was when the first message was sent. The first message is for directing a member of the group, who receives the first message when passing the area, to the same destination as the first member.

According to a further embodiment of the present invention, it is provided a computer program product for navigating. The computer program product comprises one or more computer readable storage media and program instructions stored on at least one of the one or more storage media. The program instructions comprise The program instructions comprise, in response to input on user equipment of a first member of a group who is travelling to a destination, program instructions to acquire current position information of the user equipment of the first member. The program instructions further comprise program instructions to send a first message to a server. The first message includes the current position information indicating an area where the first member was when the first message was sent. The first message is for directing a member of the group, who receives the first message when passing the area, to the same destination as the first member.

BRIEF DESCRIPTION OF THE DRAWINGS

Through more detailed descriptions of some embodiments of the present invention in the accompanying drawings, objects, features and advantages of the present disclosure will become more apparent, wherein the same reference generally refers to the same components in the embodiments of the present invention.

DETAILED DESCRIPTION

Embodiments of the present invention will now be described in more detail with reference to the accompanying drawings. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
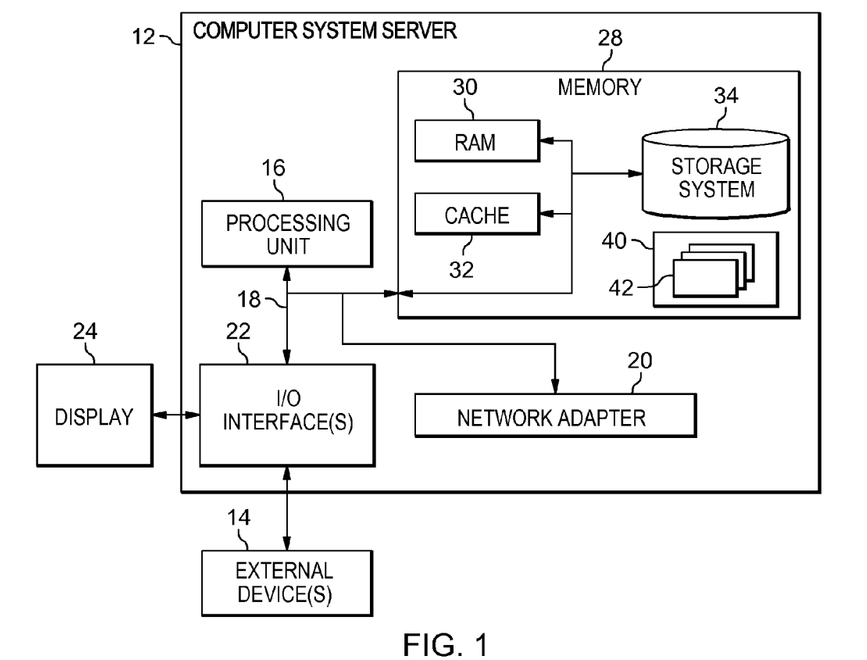
FIG. 1 shows an exemplary computer system which is applicable to implement embodiments of the present invention.

Referring now to FIG. 1, in which an exemplary computer system server 12 which is applicable to implement embodiments of the present invention is shown. Computer system server 12 is only illustrative and is not intended to suggest any limitation as to the scope of use or functionality of embodiments of the invention described herein.

As shown in FIG. 1, computer system server 12 is shown in the form of a general-purpose computing device. The components of computer system server 12 may include, but are not limited to, processing unit 16 (e.g., one or more processors), a memory 28, and a bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system server 12 typically includes a variety of computer readable storage media. Such media may be any available media that is accessible by computer system server 12, and it includes both volatile and non-volatile media, removable and non-removable media.

Memory 28 can include computer readable storage media in the form of volatile memory, such as random access memory (RAM) 30 and/or cache 32. Computer system server 12 may further include other removable/non-removable, volatile/non-volatile computer readable storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system server 12 may also communicate with one or more external device(s) 14 such as a keyboard, a pointing device, a display 24, etc.; one or more devices that enable a user to interact with computer system server 12; and/or any devices (e.g., network card, modem, etc.) that enable computer system server 12 to communicate with one or more other computing devices. Such communication can occur via Input/Output (I/O) interface(s) 22. Still yet, computer system server 12 can communicate with one or more networks such as a local area network (LAN), a general wide area network (WAN), and/or a public network (e.g., the Internet) via network adapter 20. As depicted, network adapter 20 communicates with the other components of computer system server 12 via bus 18. It should be understood that although not shown, other hardware and/or software components could be used in conjunction with computer system server 12. Examples, include, but are not limited to: microcode, device drivers, redundant processing units, external disk drive arrays, RAID systems, tape drives, and data archival storage systems, etc.

Figure 2:
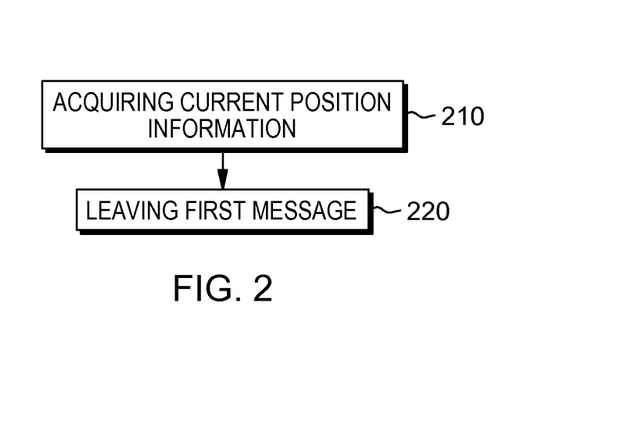
FIG. 2 shows a flowchart illustrating a method for navigating by pinning a message according to an embodiment of the present invention.

FIG. 2 shows a flowchart illustrating a method for navigating by pinning a message according to an embodiment of the present invention. As shown in FIG. 2, the method includes a step 210 of acquiring current position information and a step 220 of leaving a first message. Hereinafter, respective steps of the method will be explained in detail.

In one embodiment of the present invention, both steps 210 and 220 are performed in response to input of a first member of a group who is travelling to a destination. For example, the input may refer to when the member inputs a message by typing and touching a "Send" button on the screen of user equipment. In response to the input of the first member, in step 210, acquiring current position information of the first member. Here, the user equipment of the first member can be a mobile phone, a tablet, a smart phone, or other portable devices as long as it is able to wirelessly communicate with the server (for example, a message server) and get current position information. The position information can be obtained by the user equipment, for example, using Global Positioning System (GPS), base station positioning, Wi-Fi positioning or other positioning technologies.

Also in response to input of the first member, in step 220, leaving a first message to a server. The first message is for directing other members of the group to the same destination that the first member is travelling to. The other members receive the first message when passing the area indicated by the position information. For example, the first member may use user equipment to leave the first message and send it to the server. In one embodiment of the present invention, the area indicated by the position information is an area centered at the position indicated by the acquired position information and having a predetermined radius, such as 10 to 50 meters. In one embodiment of the present invention, the first message includes the position information indicating a position where the first message is left. In one embodiment, the first message includes a GPS coordinate where the first message is left.

In the following, a specific scenario is shown to explain the method for navigating according to an embodiment of the present invention. It is assumed that, there is a group of members (e.g., 4 people) who plan to meet at a specific tourist attraction at 10 a.m. on Saturday, and everybody sets out from home carrying a user equipment which can connect to the network and receive GPS signal. The tourist attraction is far away, some people will drive there, while other people will need to take the subway and then transfer to a bus line to reach the destination.

In one embodiment according to the present invention, the group is temporarily created for an activity and will be cancelled after the activity ends. For example, in the above scenario, the group is created for seeing a tourist attraction together. After this activity ends, the group will be cancelled. In one embodiment according to the present invention, the group is set with a first valid time period and will be cancelled after the set first valid time period lapses. Members cannot leave messages or receive messages when it is not in the valid time period. Thus, messages would not bother members after the activity. For example, the first valid time period can be 4 hours, and after 4 hours lapses, the group is dismissed. Of course, in another embodiment, the group may be a long-term group, all or some members in this group may go out for an activity. In this case, after the activity ends, the group still exists.

In one embodiment according to the present invention, members of the group head for the same destination through a plurality of different routes from different start points. As in the above scenario, since everybody sets out from their own home, they will head for the same destination through a plurality of different routes. In an alternative embodiment, members of the group may set out from the same start point but head for the destination through a plurality of different routes. In an alternative embodiment, members of the group may set out from the same start point and head for the destination through the same route.

Figure 3:
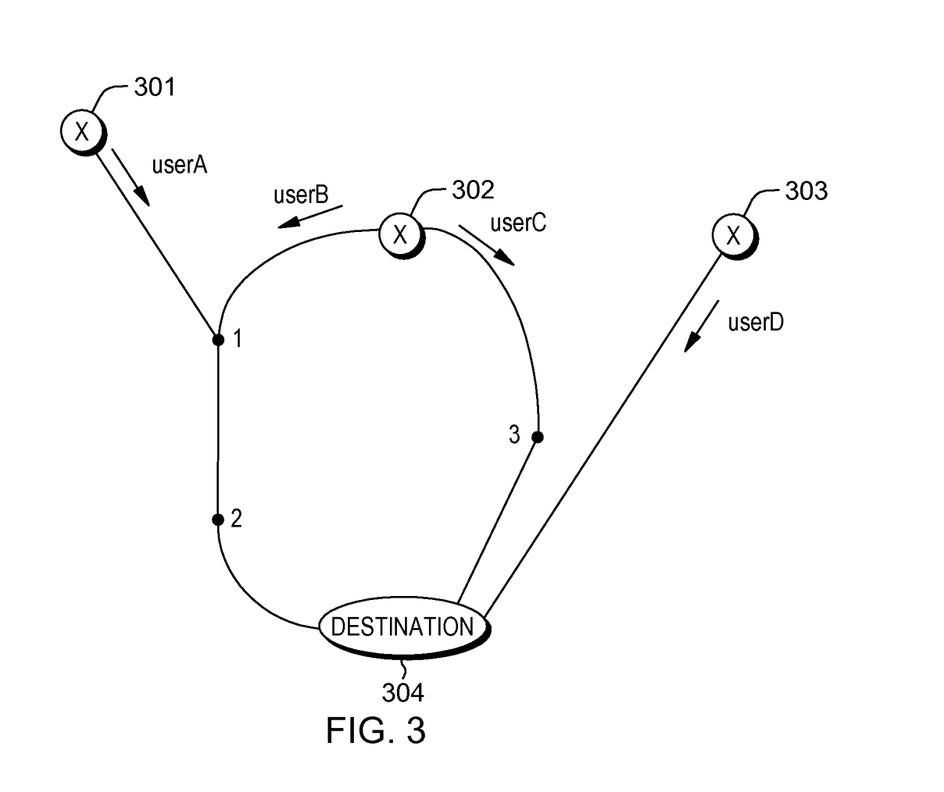
FIG. 3 is a diagram illustrating an example of members of a group traveling to the same destination according to an embodiment of the present invention.

FIG. 3 is a diagram illustrating an example of members of a group traveling to a same destination. In FIG. 3, as in the above scenario, the activity group has four members, i.e., users A, B, C and D. To reach the same destination 304 for the activity, user A sets out from start point X 301, users B and C set out from start point X 302, and user D sets out from start point X 303. It is assumed that the routes of users A and B will overlap from point 1 to destination 304 and that user A takes the subway and reaches point 1 first. Here, in this case, user A corresponds to the first member. When user A comes out from a subway station at point 1 and tries to transfer to take a bus (e.g., Line 68), he/she may be not aware that it is necessary to go across the street and then walk east 20 meters to reach the target bus station. On the contrary, at the first glance, user A may be more inclined to locate the bus station on the same street side with the subway station, and get on a bus driving in the opposite direction. Under such circumstances, many people may waste their time due to taking the wrong bus line or going in the wrong direction, and if they do not realize the mistake in time, it will waste entire team's time waiting. It is assumed that user A realizes he/she needs to go across the street to take the correct bus after he/she went to the wrong bus station and saw the bus schedule board.

At this time, the user A can operate his/her user equipment to input a message, which is uploaded from the user equipment to a server (for example, a message server), to warn other members arriving at point 1 not to take the wrong bus. For example, the message may include the following text, "Go ACROSS the street to take bus Line 68!" In one embodiment according to the present invention, the first message may include at least one of voice information, text information and video information that is for directing a member who receives the message to arrive at the destination. As shown above, the first message may include information indicating one of the following: traffic situation, guidance on how to reach a transfer point, guidance on how to make a transfer to the destination.

Figure 4:
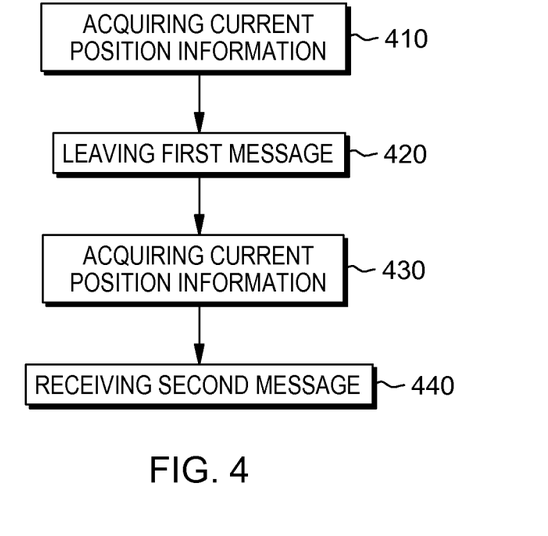
FIG. 4 shows a flowchart illustrating a method for navigating by pinning a message according to another embodiment of the present invention.

FIG. 4 shows a flowchart illustrating a method for navigating by pinning a message according to another embodiment of the present invention. Steps 410 and 420 in the method in FIG. 4 are the same as steps 210 and 220 in FIG. 2. Compared to FIG. 2, the method in FIG. 4 further includes a step 430 of acquiring current position information and a step 440 of receiving a second message. In one embodiment of the present invention, both steps 430 and 440 are performed in response to the first member passing the area where a second member of the group leaves a second message. In response to passing the area where a second member of the group leaves a second message, in the step 430, the first member acquiring current position information of the first member. The position information can be obtained by the user equipment of the first member, for example, using Global Positioning System (GPS), base station positioning, Wi-Fi positioning or other positioning technologies. In response to passing the area where a second member of the group leaves a second message, in the step 440, receiving the second message from a server. The second message is for directing other members of the group to the same destination that the second member was travelling to. The other members receive the second message when passing the area indicated by the position information of the second message. For example, the second message can be received by the user equipment of the first member.

Continuing with the example in FIG. 3, user B reaches point 1 after user A (corresponding to the second member in this case). Here, in this case, user B corresponds to the first member. When user B comes out from a subway station at point 1, i.e., passing the area where the user A left the message, the message left by user A is pushed from the server to the user equipment of the user B. At this time, for example, user B gets the text message "Go ACROSS the street to take bus Line 68!", which will avoid user B taking a wrong bus or even going to a wrong bus station and save much time for user B. Otherwise, user B might go to the bus station on the same street side with the subway station as user A did. In one embodiment according to the present invention, the second message may include at least one of voice information, text information and video information that is for directing a member who receives the message to arrive at the destination. As shown above, the second message may include information indicating one of the following: traffic situation, guidance on how to reach a transfer point, guidance on how to make a transfer to the destination.

In one embodiment of the present invention, passing the area where the second member of the group leaves the second message may comprise: the first member enters an area centered at the position where the second member leaves the second message and having a predetermined radius. In an example, the area may be a circle centered at a GPS coordinate where the message is left and having a predetermined radius, such as 20-50 meters. Of course, this is only an example, and other radius is possible. For example, in the example in FIG. 3, user A left the message at the bus station on the same street side with the subway port when he/she saw the bus schedule board. That is, when user B comes close to this wrong station in a range of 20-50 meters for example, the message will be automatically sent from the server to the use equipment of user B. After seeing the warning message "Go ACROSS the street to take bus Line 68!" on his user equipment, user B will go across the street to the correct bus station.

In one embodiment according to the present invention, after receiving the second message, the first member can leave one or more messages to override the second message at the server. In the example in FIG. 3, after receiving the message left by user A, user B can choose to leave another message to override the received message left by user A, if he/she finds the received message has an error or needs to be updated according to the current status. In another embodiment, after receiving the message left by user A, user B can choose to leave another message without overriding the received message. In this case, members of the group passing this area later will receive both of the messages from user A and user B. For example, user B may leave a text message such as "Taking bus Line 73 is also an option".

In the example of FIG. 3, user A also leaves a message at point 2, which will be received by user B later since user B will also pass point 2. The message may have the information of a shortcut walking path that is better than a transfer to a bus line to reach the destination, or meeting beautiful scenery, etc, so it would be shared the information with other members in the group. User C and user D head for the destination through different routes, user C leaves a message at point 3, but user D does not leave any messages. If user D passes point 3, he/she will receive the message left by user C. The example in FIG. 3 is limited to a small group, if the members of a group increase, useful messages will increase. If a big group is concerned, there would be many messages to be pinned by any members on various paths to the destination, and these messages can help other group members who are in the same activity and on the same path. If a member has never received any message from other members and he/she would question his/her route and need to contact other members using other communication tools such as a phone call or a SMS message.

In one embodiment according to the present invention, a message is set with a second valid time period that is not longer than the first valid time period, and the message will be deleted from the server after the set second valid time period lapses. The first valid time period is set for a group, and the second valid time period is set for a message. Typically, the second valid time period equals the remaining part of the first valid time period because it starts when the group is created, that is, the second valid time period is set as being such that the message expires at the same time the group expires. In another embodiment, the second valid time period may be set to a short time or set by the user. In a group that is valid for 4 hours, a message such as "Comes out the subway port and go facing the sun" can be set a valid time period of 30 minutes, since in this case the sunshine will not last for long, the message would be valid only for a short time.

Since the message can be voice information, text information or video information, the present invention provides good accessibility so the blind can take advantage of audio to find the correct destination, while the deaf can take advantage of video or images to find the correct destination. It is assumed that, blind Kevin needs to meet Tom at a book store. When Kevin is around a cafe he receives a voice message from Tom, in which Tom tells him that beside the book store there is a music store and it is playing a song. So Kevin knows from the message that when the sound of a song becomes louder he is closer to the book store.

With the method in FIG. 2 and the method in FIG. 4, the following advantages can be obtained: in a group activity, any member in this group is able to dynamically pin a message on any point and in any path to the activity spot. Then, any others in the group could get the message when they pass the area where the message was pinned. Therefore, in embodiments of the present invention, any user could leave a message on any point; the information in the message is always up to date, since it has a valid time period; the message is about the group activity and is concerned by all group members; the message will not confuse other members who are not in the area; for people with physical deficiencies, it is an innovative barrier-free method.

In an embodiment of the present invention, the system for navigating can be implemented to comprise one or more processors as well as a memory coupled to at least one of the processors. The system comprises a set of computer readable program instructions stored in the memory and executed by at least one of the processors in order to perform action of in response to input of a first member of a group who is travelling to a destination, acquiring current position information of the first member, and leaving a first message to a server. Here, the first message is for directing a member of the group to the same destination as the first member. When passing the area indicated by the position information members received the first message. The first message includes the position information indicating a position where the first message is left.

In one embodiment of the system, the group is temporarily created for an activity and is cancelled after the activity ends.

In one embodiment of the system, the group is set with a first valid time period and is cancelled after the set first valid time period lapses.

In one embodiment of the system, members of the group head for the same destination through a plurality of different routes or through a same route.

In one embodiment of the system, the system comprises a set of computer program instructions stored in the memory and executed by at least one of the processors in order to perform following actions: in response to passing the area where a second member of the group leaves a second message, acquiring current position information of the first member, and receiving the second message from a server. Here, the second message is for directing a member of the group who receives the second message to the same destination of the second member.

In one embodiment of the system, the first and second messages may include at least one of voice information, text information and video information that can be used for directing a member who receives the message to arrive at the destination.

In one embodiment of the system, the first message is set with a second valid time period that is not longer than the first valid time period, and the first message will be deleted from the server after the set second valid time period lapses.

In one embodiment of the system, passing the area where the second member of the group leaves the second message comprises: the first member enters an area centered at the position where the second member leaves the second message and having a predetermined radius.

In one embodiment of the system, after receiving the second message, the first member can leave one or more messages to override the second message at the server.

In one embodiment of the system, the first and second messages may include information indicating one of the following: traffic situation, guidance on how to reach a transfer point, guidance on how to make a transfer to the destination.

The present invention may be a system, a method, and/or a computer program product. The computer program product may include a computer readable storage medium (or media) having computer readable program instructions thereon for causing a processor to carry out aspects of the present invention.

In an embodiment of the present invention, it is provided a computer program product for navigating. The computer program product comprises a computer readable storage medium having program instructions embodied therewith. The program instructions are executable by a device to cause the device to perform a method comprising: in response to input of a first member of a group who is travelling to a destination, acquiring current position information of the first member, and leaving a first message to a server. Here, the first message is for directing a member of the group to the same destination as the first member with receiving the first message when passing the area indicated by the position information. The first message includes the position information indicating a position where the first message is left.

In one embodiment of the computer program product, the group is set with a first valid time period and is cancelled after the set first valid time period lapses, and the first message is set with a second valid time period that is not longer than the first valid time period, and the first message will be deleted from the server after the set second valid time period lapses.

In one embodiment of the computer program product, the method further comprises: in response to passing the area where a second member of the group leaves second a message, acquiring current position information of the first member, and receiving the second message from a server. Here, the second message is for directing a member of the group who receives the second message to the same destination of the second member.

In one embodiment of the computer program product, the first and second messages may include at least one of voice information, text information and video information that can be used for directing a member who receives the message to arrive at the destination.

In one embodiment of the computer program product, passing the area where the second member of the group leaves the second message comprising: the first member enters an area centered at the position where the second member leaves the second message with a predetermined radius.

In one embodiment of the computer program product, after receiving the second message, the first member can leave one or more messages to override the second message at the server.

In one embodiment of the computer program product, the first and second messages may include information indicating one of the following: traffic situation, guidance on how to reach a transfer point, guidance on how to make a transfer to the destination.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for navigating, comprising:
   in response to input on user equipment of a first member of a group who is travelling to a destination, one or more processors acquiring first position information of the user equipment of the first member; and
   the one or more processors sending a first user-generated message to a server, wherein the first user-generated message includes the first position information indicating a first area, centered at the first position and with a predetermined radius, where the first member was when the first user-generated message was sent,
   wherein the first user-generated message is a custom user-generated message pinned to the first position comprising instructions for directing a member of the group, who receives the first user-generated message when entering the first area, to a same destination as the first member.

2. The method of claim 1, wherein the group exists during a first valid time period.

3. The method of claim 1, further comprising:
   in response to the user equipment of the first member entering second area centered at a second position and with a predetermined radius, where a second member was when the second member sent a second user-generated message,
   the one or more processors acquiring current position information of the first member; and
   the one or more processors receiving the second user-generated message from the server, wherein the second user-generated message is a custom user-generated message pinned to the second position comprising instructions for directing a member of the group, who receives the second user-generated message when entering the second area where the second member was when the second member sent the second user-generated message, to a same destination as the second member.

4. The method of claim 1, wherein the first user-generated message includes at least one of: voice information; text information; and video information.

5. The method of claim 2, wherein the first user-generated message is valid during a second valid time period that is not longer than the first valid time period, and the first user-generated message will be deleted from the server after the second valid time period lapses.

6. The method of claim 3, wherein after receiving the second user-generated message, the first member can send one or more user-generated messages to the server to override the second user-generated message at the server.

7. A system for navigating comprising:
   one or more processors;
   one or more computer readable storage media coupled to at least one of the one or more processors;
   program instructions stored on the one or more computer readable storage media for execution by at least one of the one or more processors, the program instructions comprising:
   in response to input on user equipment of a first member of a group who is travelling to a destination, program instructions to acquire first position information of the user equipment of the first member; and
   program instructions to send a first user-generated message to a server, wherein the first user-generated message includes the first position information indicating a first area centered at the first position and with a predetermined radius, where the first member was when the first user-generated message was sent,
   wherein the first user-generated message is a custom user-generated message pinned to the first position comprising instructions for directing a member of the group, who receives the first user-generated message when entering the first area, to a same destination as the first member.

8. The system of claim 7, wherein the group exists during a first valid time period.

9. The system of claim 7, further comprising program instructions, stored on the one or more computer readable storage media for execution by at least one of the one or more processors, to:
   in response to the user equipment of the first member entering a second area centered at a second position and with a predetermined radius, where a second member was when the second member sent a second user-generated message,
   acquire current position information of the first member; and
   receive the second user-generated message from the server, wherein the second user-generated message is a custom user-generated message pinned to the second position comprising instructions for directing a member of the group, who receives the second user-generated message when entering the second area where the second member was when the second member sent the second user-generated message, to a same destination as the second member.

10. The system of claim 7, wherein the first user-generated message includes at least one of: voice information; text information; and video information.

11. The system of claim 8, wherein the first user-generated message is valid during a second valid time period that is not longer than the first valid time period, and the first user-generated message will be deleted from the server after the second valid time period lapses.

12. The system of claim 9, wherein after receiving the second user-generated message, the first member can send one or more user-generated messages to the server to override the second user-generated message at the server.

13. A computer program product for navigating, the computer program product comprising:
   one or more computer readable storage media and program instructions stored on at least one of the one or more storage media, the program instructions comprising:

in response to input on user equipment of a first member of a group who is travelling to a destination, program instructions to acquire first position information of the user equipment of the first member; and program instructions to send a first user-generated message to a server, wherein the first user-generated message includes the first position information indicating a first area centered at the first position and with a predetermined radius, where the first member was when the first user-generated message was sent, wherein the first user-generated message is a custom user-generated message pinned to the first position comprising instructions for directing a member of the group, who receives the first user-generated message when entering the first area, to a same destination as the first member.

14. The computer program product of claim 13, wherein the group exists during a first valid time period.

15. The computer program product of claim 13, further comprising program instructions, stored on the one or more computer readable storage media, to:

in response to the user equipment of the first member entering a second area, centered at a second position and with a predetermined radius, where a second member was when the second member sent a second user-generated message, acquire current position information of the first member; and receive the second user-generated message from the server, wherein the second user-generated message is a custom user-generated message pinned to the second position comprising instructions for directing a member of the group, who receives the second user-generated message when entering the second area where the second member was when the second member sent the second user-generated message, to a same destination as the second member.

16. The computer program product of claim 13, wherein the first user-generated message includes at least one of: voice information; text information; and video information.

17. The computer program product of claim 14, wherein the first user-generated message is valid during a second valid time period that is not longer than the first valid time period, and the first user-generated message will be deleted from the server after the second valid time period lapses.

* * * * *